(No Model.)  5 Sheets—Sheet 3.
S. H. SHORT.
ELECTRIC LOCOMOTIVE.
No. 546,560.  Patented Sept. 17, 1895.
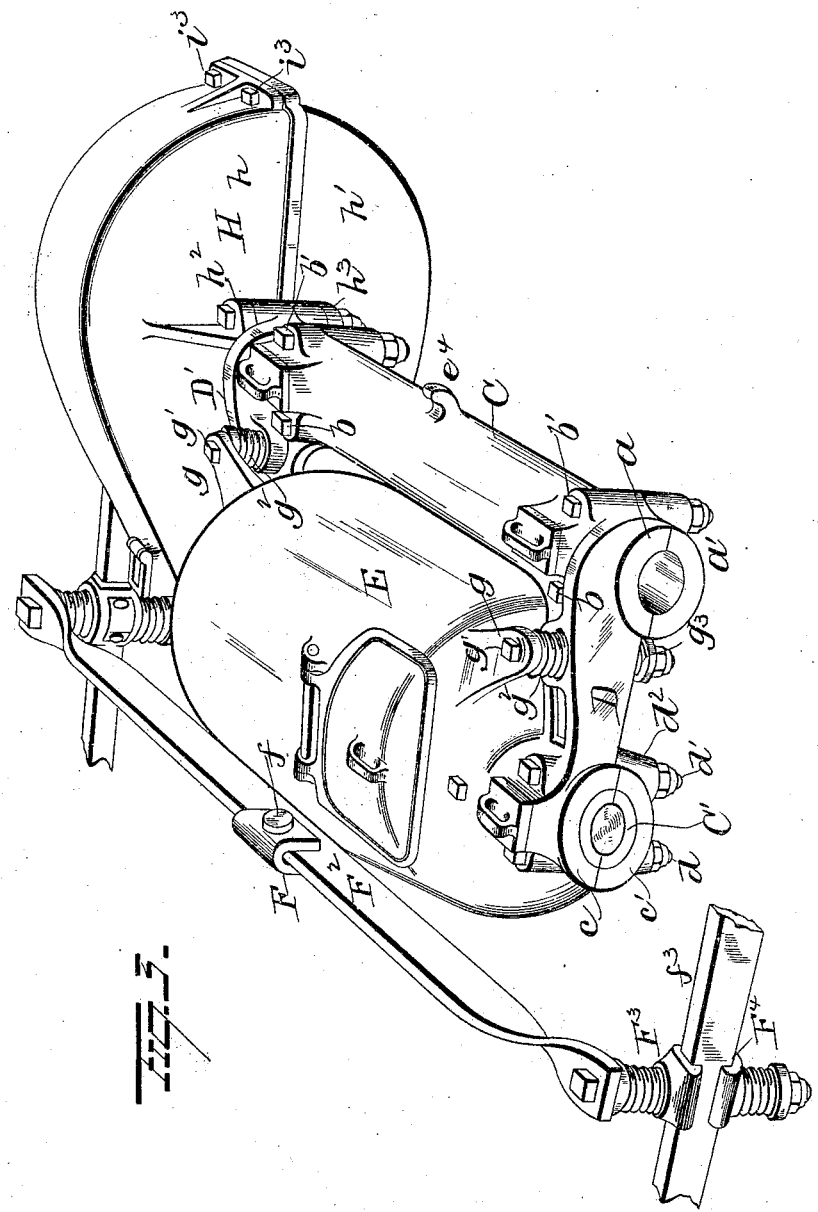
Witnesses
E. J. Nottingham
G. F. Downing
Inventor
S. H. Short
By H. A. Seymour
Attorney (No Model.)  S. H. SHORT.  5 Sheets—Sheet 4.
ELECTRIC LOCOMOTIVE.
No. 546,560.  Patented Sept. 17, 1895.
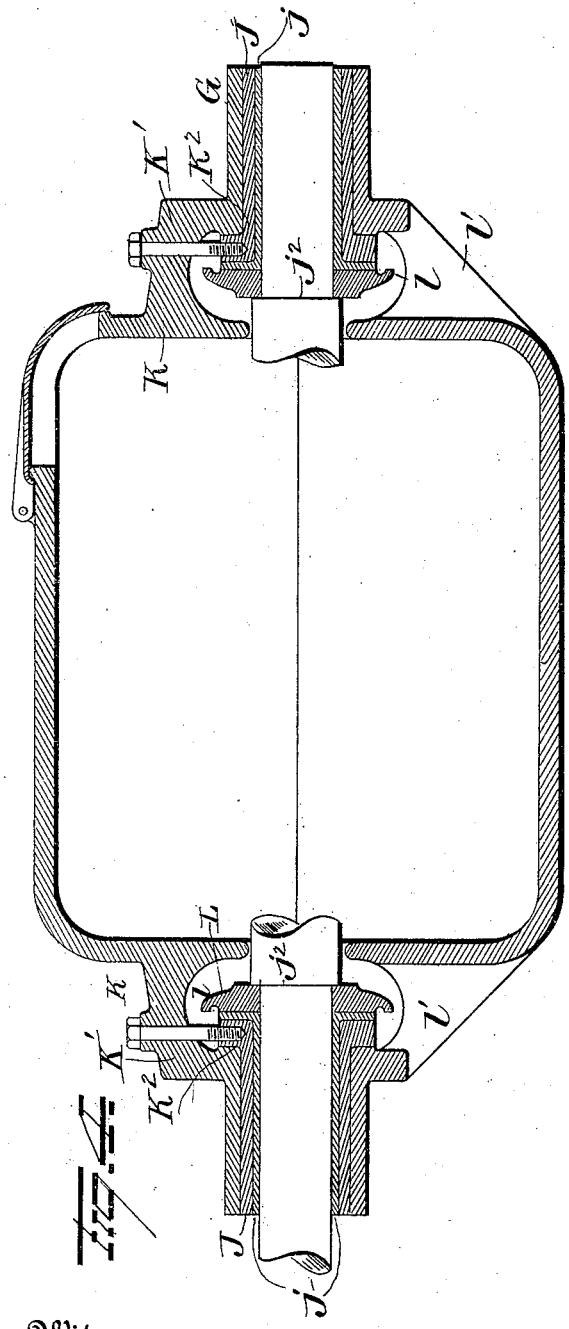
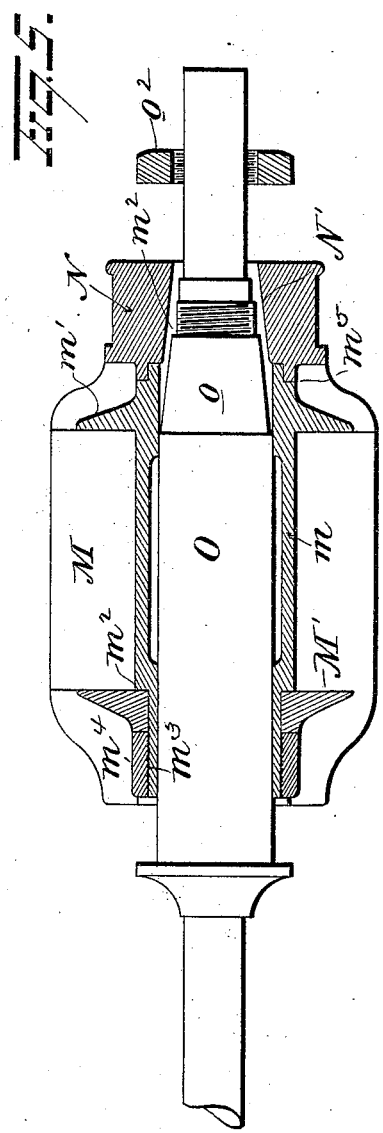
Witnesses
E. Nottingham
G. F. Downing
Inventor
S. H. Short
By H. A. Seymour
Attorney (No Model.)　　　　　　　　　　　　　　　　　　　　　　　5 Sheets—Sheet 5.
S. H. SHORT.
ELECTRIC LOCOMOTIVE.
No. 546,560.　　　　　　　　　　　Patented Sept. 17, 1895.
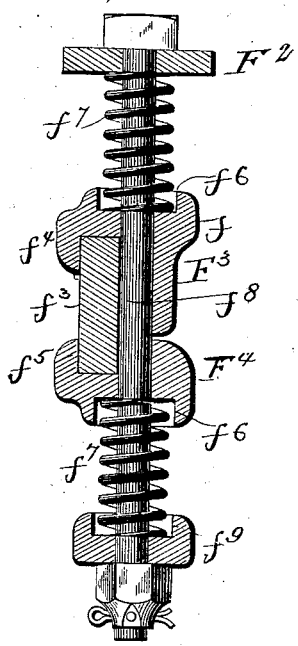
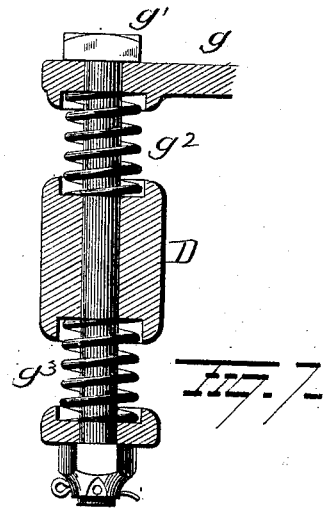
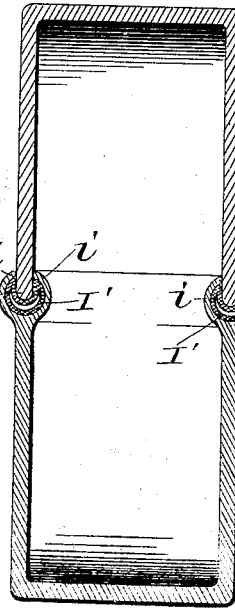
Witnesses
E. J. Nottingham
G. F. Downing
Inventor
S. H. Short
By H. A. Seymour
Attorney

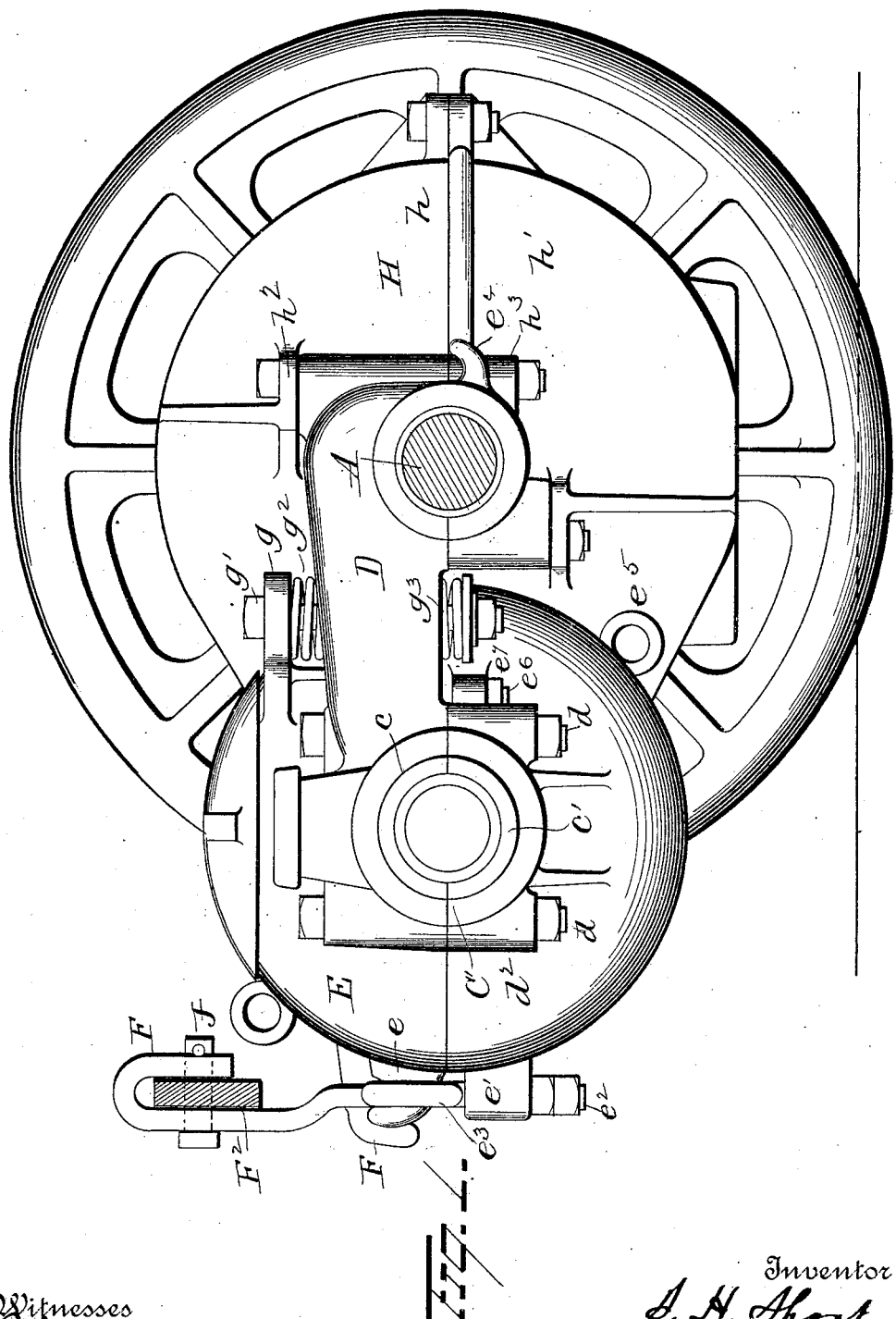

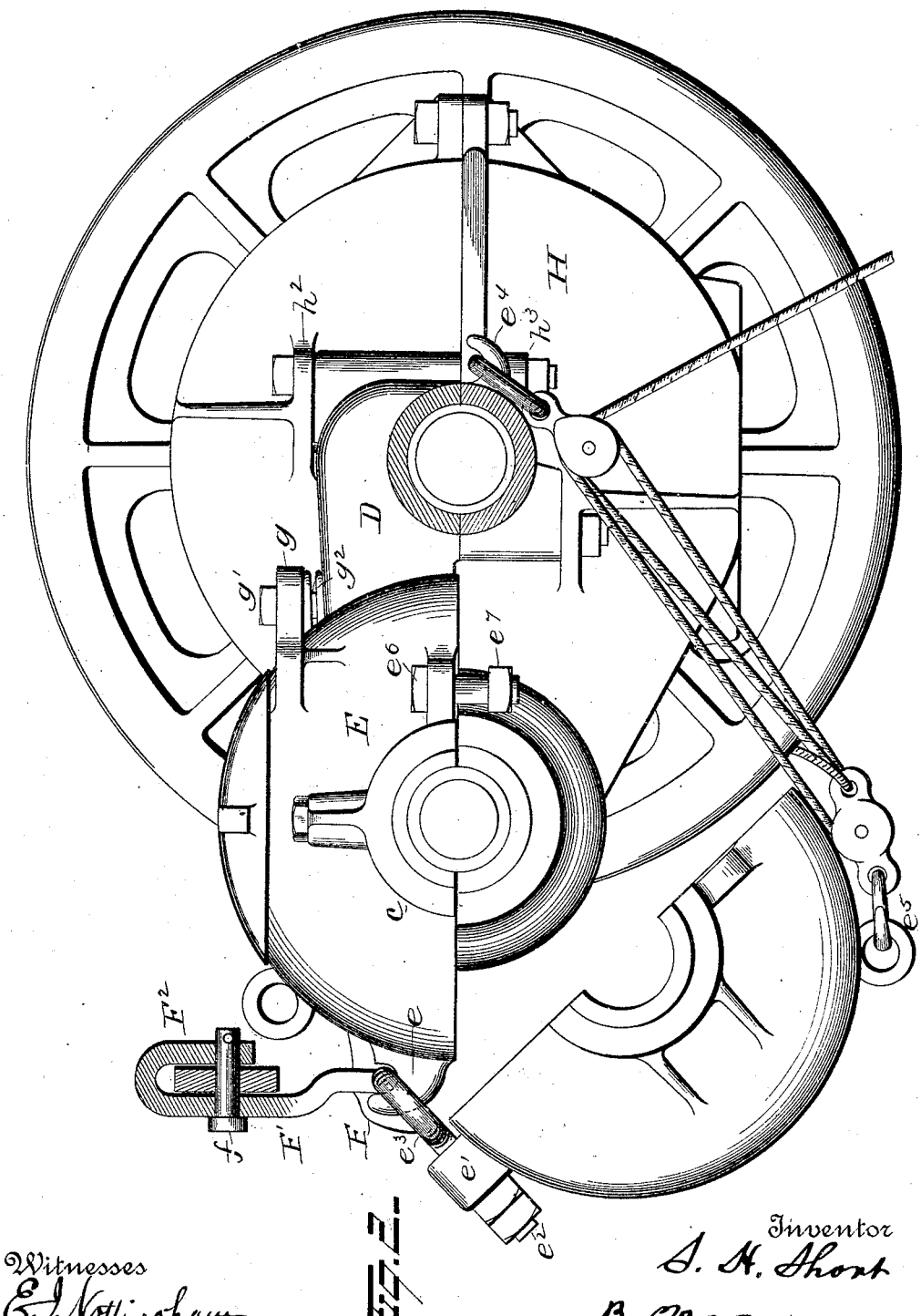

UNITED STATES PATENT OFFICE.

SIDNEY H. SHORT, OF CLEVELAND, OHIO.

ELECTRIC LOCOMOTIVE.

SPECIFICATION forming part of Letters Patent No. 546,560, dated September 17, 1895.

Application filed April 23, 1894. Serial No. 508,715. (No model.)

*To all whom it may concern:*

Be it known that I, SIDNEY H. SHORT, of Cleveland, in the county of Cuyahoga and State of Ohio, have invented certain new and useful Improvements in Electric Locomotives; and I do hereby declare the following to be a full, clear, and exact description of the invention, such as will enable others skilled in the art to which it appertains to make and use the same.

My invention relates to an improvement in electric locomotives; and it consists in certain features of construction and combinations of parts, as will be hereinafter described, and pointed out in the claims.

In the accompanying drawings, Figure 1 is a view in end elevation of my improvement. Fig. 2 is a similar view illustrating the lower half of the motor-casing swung down, so as to allow of access to the armature or other parts of the motor. Fig. 3 is a view in perspective of the motor. Fig. 4 is a longitudinal section of the motor-casing illustrating its bearings. Fig. 5 is a longitudinal section of the armature-hub, commutator-sleeve, the armature-shaft being shown in side elevation. Fig. 6 is a detached view of the bracket-arm for yieldingly connecting the suspension cross-bar with the side bars of the truck-frame. Fig. 7 is a cross-section taken through one of the arms of the swinging frame and the springs for supporting one side of the motor-casing, and Fig. 8 is a detached section of the joint formed between the upper and lower sections of the gear-casing.

A represents a car-axle, on which is journaled a frame B, consisting of the sleeve C and arms D D'. Sleeve C is journaled on the axle and is made of the upper and lower sections $a\, a'$, which are secured together by means of bolts $b\, b'$ at each of its ends. Arms D D' are each cast integral with the upper section $a$ of the sleeve, and each has formed in its outer end the upper half $c$ of a journal-bearing C', the lower and detachable half $c'$ being secured to the upper half by means of the bolts $d\, d'$, passing vertically through the lugs or offsets $d^2$.

E represents the motor-casing, which is preferably made cylindrical in form, though it may be of any other shape if desired. This casing is divided longitudinally through its center to enable of ready access to its interior. The upper section has upturned hooks $e$ cast on its side near each of its ends, while perforated lugs $e'$ are cast on the corresponding side of the lower section and near its ends. Through the perforated lugs $e'$ are inserted eyebolts $e^2$, the eyes $e^3$ of which are hooked over the hooks $e$ and thereby forming a hinged joint between the upper and lower section of the casing. On the sleeve C is cast a hook $e^4$, while the lower portion of the casing has a ring $e^5$ cast thereon or secured thereto. These attachments enable the lower half of the motor-casing to be lowered and raised by a block and tackle, as illustrated in Fig. 2. The ends of both the upper and lower portions of the casing have a perforated lug cast thereon, through which are inserted the bolts $e^6$ for fastening the two parts of the casing together. By simply removing the nuts $e^7$ on bolts $e^6$ the lower half of the casing may be readily swung down, as shown in Fig. 2.

On the outer side of the upper half of the casing is cast a downwardly-turned hook F, which is located midway between the ends of the casing. The lower end of a swinging link F' is provided with an eye which engages hook F, while its upper end is bent into the form of a hook and engages the suspension cross-bar $F^2$. A bolt $f$ is inserted through the cross-bar and upper end of the swinging link, thereby forming a pivotal bearing and enabling the lower end of the link to have a transverse swinging movement. In the event the bolt $f$ should break, the hooked upper end of the link would engage the cross-bar to prevent the motor-casing from falling. The outer ends of the cross-bar are twisted into a horizontal plane and are yieldingly connected with the side bars $f^3$ of the truck-frame in the following manner: Brackets $F^3\ F^4$ are constructed with flanges $f^4\ f^5$, which fit over the sides of the side bars, one bracket engaging the upper and the other the lower side of the bar. Each bracket is provided with a pocket or recess $f^6$, within which is seated one end of a spring $f^7$. A bolt $f^8$ extends through the two brackets at one side of the side bar, the upper and lower ends of the bolt being encircled by a spiral or other spring $f^7$. The nut or washer $f^9$, attached to one end of the bolt, operates to tie the parts together. The two springs serve to cushion the suspension-bar against vertical shocks in either direction, and hence the motor, which is supported at one side by the cross-bar through the medium of the swinging link, is yieldingly supported and shielded against violent shocks, while it may have a limited lateral motion in both directions, and thereby accommodate itself to the curves in the trackway.

Each end of the motor-casing has cast thereon a trunnion G. Each trunnion is divided longitudinally, one-half being cast on the upper section of the casing and the other half on the lower section. These trunnions, as has been stated, are journaled in the outer ends of the arms D D', whereby the motor-casing is allowed a free rotary yielding movement in either direction. The opposite ends of the motor-casing have a perforated lug $g$ cast thereon, through which are inserted the bolts $g'$, which extend vertically through the arms D D'. A spring $g^2$ is interposed between each lug $g$ and one of the arms D D', while a spring $g^3$ is interposed between the lower face of each arm and a washer or nut on the lower end of the bolt. By means of these springs the rear side of the motor-casing is shielded against shocks. From the foregoing it will be observed that the motor is journaled in the outer ends of the arms D D' and is allowed a yielding rotary movement and is shielded by the springs on its opposite sides against injury due to shocks.

H represents the gear-casing, which is made in two sections $h\ h'$. The upper section is provided with laterally-projecting lugs $h^2\ h^2$, only one being shown. These lugs are supported upon the arms D, and are secured to the latter by means of suitable bolts. The bolt which serves to secure the two parts of the sleeve together also passes through the lug $h^2$ and serves to secure one side of the upper section of the gear-casing to the arm D, while by a similar fastening the other side of the upper section of the gear-casing is secured to the arm. The lower section of the gear-casing is also provided with laterally-projecting lugs $h^3\ h^3$, (only one being shown,) which rest against suitable seats formed on the under side of arm D, and are secured thereto by bolts, the bolt securing the two parts of the sleeve together, being employed to secure one side of the lower section of the gear-casing to the arm D. The lower section of the gear-casing is constructed with two upwardly and inwardly curved lips $i\ i$, formed on its upper edge, which constitute an annular recess I. Within this annular recess or gutter is placed a rubber or other flexible tube I'. The lower edge $I^2$ of the upper section of the casing, seats itself on the flexible tube and forms it into the condition shown in Fig. 8, with the effect of forming a dust and water-tight joint which completely excludes the entrance of dust and water to the gearing inclosed within the casing. The two sections of the casing are firmly secured together by means of the bolts $i^3$.

In Fig. 4 I have represented the motor-casing in longitudinal section. Within the two-part trunnions on each end of the casing is inserted a bearing J, lined with Babbitt metal $j$. These bearings are each made in one piece. A bolt K is inserted through the outwardly-projecting flange K' at each end of the casing and is screwed into the outwardly-projecting flange $K^2$ formed on the inner end of each bearing. The object of this construction is the following: When it is desired to inspect the armature or other parts of the motor, the lower section of the casing may be swung down, while the armature-shaft and amature mounted thereon will be upheld by means of the bolts K K. When it is desired to remove or to lower the armature, the bolts K K are unscrewed from the bearings, and then the lower section of the casing when lowered will support and carry with it the armature-shaft and armature. Between the inner end of the bearings J and shoulders $j^2$ formed on the armature-shaft are interposed the thrust-bearings L, which serve to take the end thrust of the armature-shaft and retain it against endwise movement. The thrust-bearings are each formed with an outwardly-curved lip $l$, which serves to guide and discharge the waste oil outwardly from the motor-casing and thus prevent injury to the motor. The under side of the flanges on the ends of the lower section of the motor-casing are cut away or cast with openings $l'$ to allow any oil that may drip from the bearings to fall on the ground and prevent its finding entrance to the interior of the motor-casing.

The armature-hub M is composed of the sleeve $m$, having a flange $m'$ formed integrally therewith at one end, while the opposite end of the sleeve is constructed with a shoulder $m^2$ and a screw-threaded end $m^3$. A detachable flange M' is seated against the shoulder $m^2$ and is retained in place by means of the nut $m^4$. The opposite end of the sleeve is provided with a shoulder $m^5$, against which is seated the correspondingly shouldered end formed on the inner end of the commutator N, which is constructed with an inwardly-tapered bore N'. Armature-shaft O is beveled at $o$ and provided with a screw-threaded section $o'$, with which latter engages the nut $o^2$. The construction of parts above described is for the purpose of allowing for the ready removal of the commutator or armature shaft for renewal or repair. When the commutator needs repairing or removal, or when the armature-shaft becomes bent or its bearings worn, it is simply necessary to unscrew the nut $o^2$ and drive the armature-shaft endwise toward the left, which is greatly facilitated by making the beveled contact-surfaces described and remove the shaft, and, if necessary, remove the commutator.

I have not illustrated the gearing, deeming it unnecessary so to do, it being sufficient to state that the gearing on the armature-shaft meshes either with a gearing rigidly secured to the axle or with intermediate gearing meshing therewith. Any yielding movement of the motor in either direction, either upwardly or downwardly, being in the arc of a circle of which the driving-axle is the center and the supporting-frame the radius, it follows that the driving-gears will always retain the same relative positions and be kept in perfect mesh throughout all adjustments and positions of the motor.

My improved electric locomotive is extremely simple, compact, and durable in its construction and arrangement of parts. Access may be readily had to any part of the motor, as the construction of parts is specially designed with the object in view. The pounding of the rail-joints resulting from mounting a heavy motor in any of the ways usually resorted to is obviated by my improvement, because, by my method of mounting, the axle as well as the motor itself is shielded against violent shocks due to an uneven trackway or obstructions on the rails.

It is evident that slight changes in the construction and relative arrangement of parts might be resorted to without departing from the spirit and essence of my invention, and hence I would have it understood that I do not limit myself to the precise construction and arrangement of parts shown and described; but, Having fully described my invention, what I claim as new, and desire to secure by Letters Patent, is—

1. In an electric locomotive, the combination with an electric motor journaled in arms journaled on the driving axle, and gearing connecting the armature shaft and axle, of a cross-bar yieldingly mounted on the truck-frame, and a laterally swinging link, for connecting one side of the motor casing and the cross-bar, substantially as set forth.

2. In an electric locomotive, the combination with an electric motor journaled in the free ends of a frame mounted at its outer end on the driving axle, and gearing connecting the motor and axle, of a cross-bar supported at its opposite ends by the side bars of the truck-frame; springs interposed beyond the cross-bar and side bars, and a swinging link connecting one side of the motor casing with the cross-bar, substantially as set forth.

3. The combination with a motor casing provided with a downwardly projecting hook, of a cross-bar and a link pivotally connected with the cross-bar, and detachably secured at its lower end to the hook on the motor casing, substantially as set forth.

4. The combination with a motor casing provided at one side with a hook, of a cross-bar, and a link formed with a hooked upper end which is pivoted to the cross-bar, and which is detachably secured at its lower end to the hook on the motor, substantially as set forth.

5. The combination with the cross bar, and side bar of the truck-frame, of brackets fitting against the upper and lower sides of the side bar, a bolt extending through the cross-bar and the brackets at one side of the side bar, and springs interposed between the brackets and cross bar and nut or washer on the lower end of the bolt, substantially as set forth.

6. The combination with a frame journaled at one end on the driving axle, of a motor casing provided with trunnions which are journaled in the outer end of said frame, the casing and trunnions being divided or formed in detachable sections, substantially as set forth.

7. The combination with a motor casing constructed with end trunnions, said casing and trunnions being divided or formed in detachable sections, of a hook formed in one section of the casing, a perforated lug on the other section, and an eye bolt for connecting together such sections and forming a hinged joint between them, substantially as set forth.

8. The combination with a two part motor casing, one part having an upturned hook cast on one side and perforated lugs on the opposite ends, the other part having perforated lugs cast on its ends, and on one side, of an eye bolt for connecting the adjacent parts of the casing, and bolts for securing their ends, substantially as set forth.

9. The combination with a two part motor casing having the parts hinged together at one side, one of the sections being provided with a ring or staple, of a sleeve journaled on the axle, said sleeve having a hook cast thereon, whereby a block and tackle may be readily applied to the lower section of the casing for raising or lowering it, substantially as set forth.

10. The combination with a frame journaled on the driving axle, an electric-motor journaled in the outer end of said frame, the motor casing and its trunnions being formed in two longitudinally divided sections, and the journal bearings in the frame formed in two parts which are bolted together, substantially as set forth.

11. The combination with the driving axle of a vertically adjustable frame constructed with a divided sleeve that is journaled on the axle, substantially as set forth.

12. The combination with an electric motor casing having outwardly projecting lugs cast on its opposite ends, of the side arms of a frame in which the motor is mounted, having spring pockets or recesses formed in the upper and lower side of each arm, of bolts extending through the lugs and side arms, and springs encircling said bolts and seated at one end in said pockets or recesses, substantially as set forth.

13. The combination with frame journaled on the driving axle, of a two part gear casing having lugs cast on the inner sides of its upper and lower sections said lugs being arranged to engage the upper and lower sections of the sleeve and be secured by means of the bolts which secure the sleeve sections together, substantially as set forth.

14. In an electric locomotive, the combination with the lower section of the gearing casing having an annular recess formed in its upper edge, of a flexible tube located in said recess, the lower edge of the upper section seated upon said tube and bolts for securing the two sections together, substantially as set forth.

15. The combination with the divided motor casing having divided trunnions formed on its opposite ends, of journal bearings encircling the journals on the armature shaft, and means for detachably securing the journal bearings to the upper sections of the divided trunnions, substantially as set forth.

16. An electric motor casing having trunnions formed on its outer ends openings being formed between the lower sections of the trunnions and the casing, substantially as set forth.

17. The combination with an electric motor casing made in two parts removably connected together and having trunnions cast on its opposite ends, of journal bearings supported within said trunnions, flanges on said journal bearings, an armature shaft journaled in the bearings, shoulders on said armature shaft, and thrust bearings interposed between the shoulders on the armature shaft and the flanges on the journal bearings, substantially as set forth.

18. The combination with a divided electric motor casing having divided trunnions cast on its opposite ends, of thrust bearings located in a recess formed between the casing and inner ends of the trunnions, said thrust bearings being constructed with an annular oil groove, substantially as set forth.

19. The combination with an armature hub, and commutator detachably secured thereto, said commutator having an inwardly beveled bore, of an armature shaft constructed with a beveled section that fits the beveled bore or seat in the commutator, substantially as set forth.

In testimony whereof I have signed this specification in the presence of two subscribing witnesses.

SIDNEY H. SHORT.

Witnesses:
C. S. DRURY,
A. W. BRIGHT.